United States Patent [19]
Fritsche

[11] Patent Number: 5,883,952
[45] Date of Patent: Mar. 16, 1999

[54] COMMUNICATION SWITCHING SYSTEM WITH PERFORMANCE CHARACTERISTICS SYSTEM AND A BASE SWITCHING SYSTEM

[75] Inventor: Norbert Fritsche, München, Germany

[73] Assignee: Siemens Aktiengesellschaft, Munich, Germany

[21] Appl. No.: 750,890

[22] PCT Filed: Jun. 14, 1995

[86] PCT No.: PCT/DE95/00764

§ 371 Date: Dec. 16, 1996

§ 102(e) Date: Dec. 16, 1996

[87] PCT Pub. No.: WO95/34999

PCT Pub. Date: Dec. 21, 1995

[30] Foreign Application Priority Data

Jun. 15, 1994 [DE] Germany .......................... 44 20 886.3

[51] Int. Cl.⁶ .............................. H04M 3/42; H04M 3/00
[52] U.S. Cl. ......................... 379/242; 379/201; 379/229
[58] Field of Search ................................... 379/201, 207, 379/219, 220, 221, 242, 229, 268, 269; 370/360

[56] References Cited

U.S. PATENT DOCUMENTS

| 4,903,258 | 2/1990 | Kuhlmann et al. | 370/360 |
|---|---|---|---|
| 5,448,631 | 9/1995 | Cain | 379/201 |
| 5,455,854 | 10/1995 | Dilts et al. | 379/201 |
| 5,473,680 | 12/1995 | Porter | 379/201 |
| 5,517,563 | 5/1996 | Norell | 379/221 |
| 5,724,406 | 3/1998 | Juster | 379/201 |

FOREIGN PATENT DOCUMENTS 37 27 942 A1  3/1989  Germany .

OTHER PUBLICATIONS

Steuerungskonzept einer ISDN–Vermittlungsanlage–Kaderall et al–D.39 (1986) pp. 394–397
Siemens–Produktschrift: System HICOM 600–Hrsg. Bereich Privat–und Sonder–Kommunikationsnetze, 1984 pp. 52/53.
ISDN–in the Office–HICOM–Technology and Applications of the HICOM ISDN Communication System pp. 48–53, Dec. 1985.
ISSN8756–6621/91/0004 1991 Scripta Technica, Inc.–Hierarchical Service Control Scheme for Intelligent Network Services–kondo et al.
ISS '92, Oct. 1992, vol. 2–Network of the Future–Gary J. Handler–p. B5.2.
IEEE–1991–Placement Of Feature Management Functionality in IN–Ramani et al–pp. 632–636.
Annual Review of Communications–vol. XXXXVI–1992–93–AIN Evolution Strategies/Alternatives–Buyukdura et al–pp. 496–505.
COM XI–R 212–E–New Recommendation Q1214–Distributed Functional Plane For Intelligent Network CS–1, Undated.

*Primary Examiner*—Scott Wolinsky
*Attorney, Agent, or Firm*—Hill & Simpson

[57] ABSTRACT

A communication switching system, composed of a performance characteristics system (LMS) and a base switching system (BVS), whereby the base switching system (BVS) has a basic call controller (BRS) for controlling a 2-party call composed of two connections communicating via messages with respectively allocated automatic status units, a database (DB) containing call objects (RO) and a plurality of performance characteristics control modules (LM-SB) available in exchange in the form of callable functions for the optional influencing of the call objects. Both the basic call controller (BRS) as well as the performance characteristics control modules (LM-SB) can access the database (DB). In an executive sequence of the basic call controller (BRS), a specific processing module is allocated to each message type in order to enable an initiation of handling of influenced call objects (RO) upon employment of processing blocks of the executive sequence of the basic call controller (BRS) by the performance characteristics system (LMS).

5 Claims, 8 Drawing Sheets

COMMUNICATION SWITCHING SYSTEM WITH PERFORMANCE CHARACTERISTICS SYSTEM AND A BASE SWITCHING SYSTEM

This application is a national stage application of PCT application Ser. No. PCT/DE95/00764 filed Jun. 14, 1995.

BACKGROUND OF THE INVENTION

The invention is directed to a communication switching system In particular, it is directed to a switching system composed of a performance characteristics system and a base switching system.

Contemporary switching systems support a plurality of performance characteristics. These are auxiliary telecommunication services such as, for example, call redirection, conference service, hold for inquiry, hold, etc. Performance characteristics are realized in processor-controlled switching systems within the switching control procedures. These switching control procedures, also called switching software, contain the call control as well as the performance characteristics. The performance characteristics are thereby meshed with the call control as well as with one another. This leads to a high software complexity, the software structure thus becoming inflexible with respect to the introduction of new performance characteristics. In order to shorten the long introduction times for new performance characteristics caused as a result thereof, it has been considered to realize the parts of the control procedures that were hitherto dependent on one another separately in independent modules that respectively have a fixed interface toward the outside. Initial steps for separating the performance characteristics control from the switching control are pursued in the framework of the standardization procedures "Intelligent Network" at ITU-T SG 11 concerned with intelligent networks. In this respect, see the guidelines of the CCITT, "New Recommendation Q.1214. Distributed Functional Plane for Intelligent Network CS-1, COM XI-R212-E, pages 7 though 69 as well as annex pages 7 through 9.

A cleanly structured switching architecture arises by decoupling the performance characteristics control from the switching control, which is thereby reduced to its basic functionality. This is very modularly constructed and allows the fast introduction of new performance characteristics. The separation of the performance characteristics also enables development independent of the performance characteristics and the call control.

Such a structure divides a switching system or, respectively, the switching software into a base switching system and a performance characteristics system. The main components of a base switching system are a call controller, a database and a plurality of performance characteristics control modules. The call control is reduced to its basic tasks, the setup and cleardown of connections or, respectively, calls and is therefore referred to as basic call control. The performance characteristics control modules thereby form a set of functions via which the call objects of call, subscriber and connection can be accessed, via which, thus, calls can be manipulated.

The performance characteristics themselves are contained in the performance characteristics system that communicates with the base switching system via a protocol.

The basic call controller of the base switching system has the job of implementing the setup and cleardown of calls or, respectively, their appertaining connections according to subscriber requests. In the framework of its normal execution, consequently, it handles a two-party call. Over and above this, mechanisms are provided for reporting certain events to the performance characteristics control. Without influencing the performance characteristics system, the base switching system can control a call between two subscribers, i.e. it is autonomous with respect to the setup and cleardown of two-party calls. A two-party call exists between two communication terminal equipment respectively allocated to subscriber line units with a respective connection that produces the reference between a communication terminal equipment and the call. Each connection has a respective automatic status unit allocated to it as automatic status unit of the connection. The connections are linked to one another via the call.

Specific transitions that are triggered due to external events occur between the statusses of the automatic status units. Such events are subscriber/network messages or internal messages, namely messages between the two connections of a call.

SUMMARY OF THE INVENTION

The present invention is based on the object of citing a communication switching system composed of a performance characteristics system and a base switching system of the type recited above that enables a simple and unambiguous influence of the performance characteristics system on the base switching system.

In general terms, the present invention is a communication switching system, composed of a performance characteristics system and a base switching system. The base switching system has a basic call controller for controlling a 2-party call composed of two connections communicating via messages with respectively allocated automatic status units. A database contains call objects and a plurality of performance characteristics control module at the exchange side in the form of callable functions for the optional influencing of the call objects. Both the basic call controller as well as the performance characteristics control modules can access the database. A specific processing module is allocated to each message type in the executive sequence of the basic call controller in order to enable an initiation of the handling of the influenced call objects upon employment of the processing blocks of the executive sequence of the basic call controller by the performance characteristics system.

Advantageous developments of the present invention are as follows:

A structure of the processing modules of the executive sequence of the basic call controller is such that, following interruption of the processing module execution, an initiation of the continued execution by the performance characteristics system is possible at an event generation point.

Status transitions of the individual automatic status units can be triggered by subscriber-side events and by messages within the base switching system, for example from the automatic status unit of the respectively other connection. The performance characteristics system initiates the handling of the influenced call objects by initiating an internal message to one of the automatic status units.

The performance characteristics system can access the database as well as initiate the handling of the influenced call objects using performance characteristics control modules.

Inventively, both the basic call controller as well as the performance characteristics control modules can access the same database within the base switching system. Among other things thereby enabled is that information elements of the call objects that are used by the basic call controller for handling a call and are read from the database for this purpose can be manipulated by the performance characteristics system with the assistance of specifically allocated performance. characteristics control modules before the handling by the basic call controller.

The control execution of the basic call controller is divided into processing modules that are unambiguously allocated to individual messages. Messages are thereby both internal messages between the connections as well as subscriber/network messages between the subscriber line units and the basic call controller.

As a result thereof, the handling of call objects influenced in the database upon employment of the control execution of the basic call controller can be initiated by the occasioning of the output of a respectively required message. I.e., that the performance characteristics system can manipulate specific information elements of specific call objects of a call in the database according to the requirements of the corresponding performance characteristic as needed with the assistance of a respectively allocated function, namely the corresponding performance characteristics control module of the base switching system, and can subsequently initiate a message to the automatic status units of the affected connection in the basic call controller, potentially also with the assistance of a performance characteristics control module defined for the corresponding purpose. This message then leads to a handling of the influenced call objects by the basic call controller of the base switching system. In this case, the basic call controller can interpret such a message as a standard internal message and need not distinguish whether this internal message has been initiated by the automatic status unit of a connection that usually outputs such a message or by the performance characteristics system. Thus, performance characteristics control modules are, for example, access mechanisms to call objects. These access mechanisms can also enable a renewed restart of the control execution of the basic call controller initiated by the performance characteristics system.

In a beneficial embodiment of the invention, individual processing modules of the executive sequence of the basic call controller are structured such that, following interruption of the processing module. execution at an event generation point, the performance characteristics system can initiate a continuation of the sequence at the place of the corresponding event generation point. In this case, such processing modules are in turn divided into corresponding sub-modules that provide corresponding status entry points in the region of said event generation points, namely in the region of status transitions. The event generation points are thereby provided in the processing modules of the basic call controller and can be activated as needed—usually by corresponding performance characteristics or the performance characteristics control system. When an event generation point is activated, then a message about the status that has been reached or, respectively, the requirement of a reply as expected action is transmitted to the performance characteristics system when the executive sequence reaches this event generation point. The executive sequence can be continued only after receiving the required reply.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
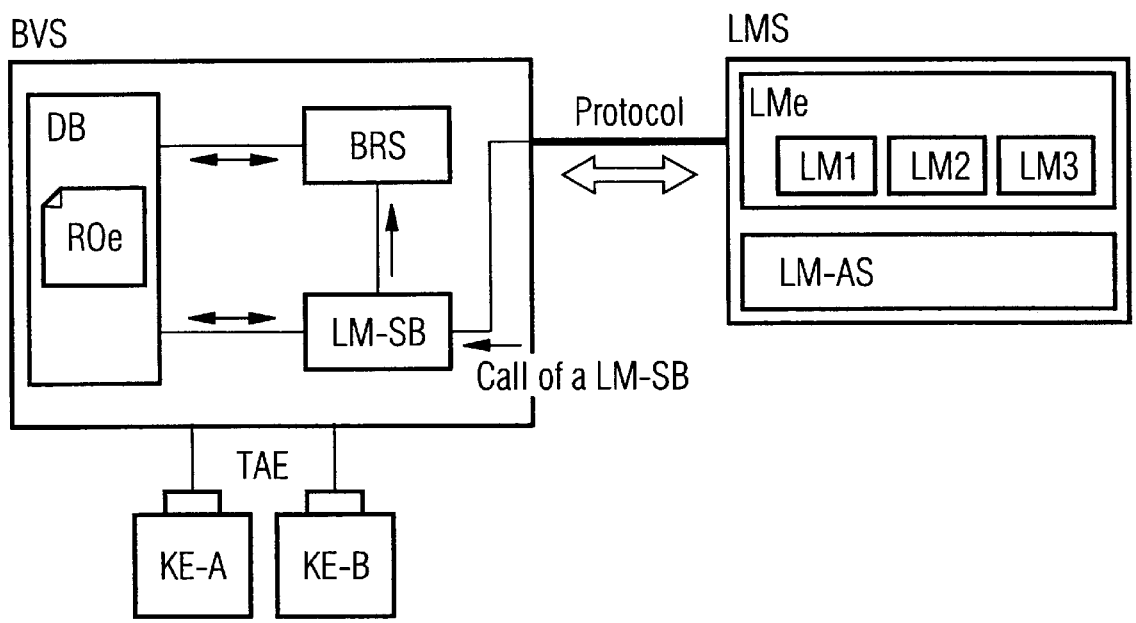
FIG. 1 is a block illustration of the structure of a communication system with inventive fashioning of the switching system.

FIG. 1 shows the structure of a communication system composed of a base switching system BVS that communicates with a performance characteristics system LMS via a protocol and that, via a subscriber/network interface (not shown), is connected to communication terminal equipment KE-A and KE-B via respective subscriber line units TAE. The base switching system BVS contains a basic call controller BRS and a plurality of performance characteristics control modules LM-SB. The base switching system BVS also contains a database DB in which call objects ROe are contained. A call object RO can thereby be created and manipulated on the basis of a subscriber/network request initiated by a communication terminal equipment KE-A, KE-B as well as with the assistance of performance characteristics control modules LM-SB. Inventively, the performance characteristics control modules LM-SB and the basic call controller BRS access the same database DB. Accordingly, performance characteristics control modules LM-SB can manipulate call objects ROe in the database DB, so that the basic call controller BRS undertakes a handling of the call objects initiated by the performance characteristics system LMS via the performance characteristics control modules LM-SB on the basis of these manipulated call objects ROe with the assistance of its standard executive sequence.

As an exemplary embodiment, FIG. 1 shows a possible structuring of a performance characteristics system LMS. According thereto, a performance characteristics system LMS is composed of a performance characteristics executive sequencer LM-AS and of a plurality of performance characteristics LME, for example a first through third performance characteristic LM1, LM2 and LM3.

The base switching system BVS is decoupled from the performance characteristics system LMS but can be influenced by the latter in a defined way. The performance characteristics control modules LM-SB thereby form the interface between the base switching system BVS and the performance characteristics system LMS via which the performance characteristics system LMS can access the call objects ROe of the database in both reading as well as writing fashion. In this case, writing means the entry of call objects for producing a call or, respectively, a half-call or the modification of information elements of the call objects ROe. Each performance characteristics control module LM-SB thereby forms a complete function for a specific type of access. The performance characteristics control modules make use of the standard executive sequence of the basic call controller BRS for setup and cleardown of connections, i.e. do not implement the setup and cleardown of connections themselves. The processing of the performance characteristics control modules LM-SB can consequently be imaged onto a mere manipulation of the call objects in the database. The handling of the manipulated or, respectively, newly created call objects ROe is then handed over to the basic call controller BRS. This is then respectively supplied only with the identifier of the call object RO and handles this with a normal executive sequence of the two-party call.

For this purpose, it is necessary to suitably structure the basic call controller BRS in order to acquire the necessary entry points for processing the call objects ROe modified by the performance characteristics control modules LM-SB. For this purpose, the basic call controller BRS is subdivided into processing modules that respectively process only a single message. Both the individual subscriber/network message as well as the individual internal messages are messages in this sense. The advantage of such a basic call controller structure lies therein that the creation of a new connection can be implemented by generating the corresponding internal message that is then handled by the basic call controller BRS according to the two-party call. When creating a new connection, for example, the internal message I-Setup with the required parameters would be initiated (see FIG. 2).

Figure 2:
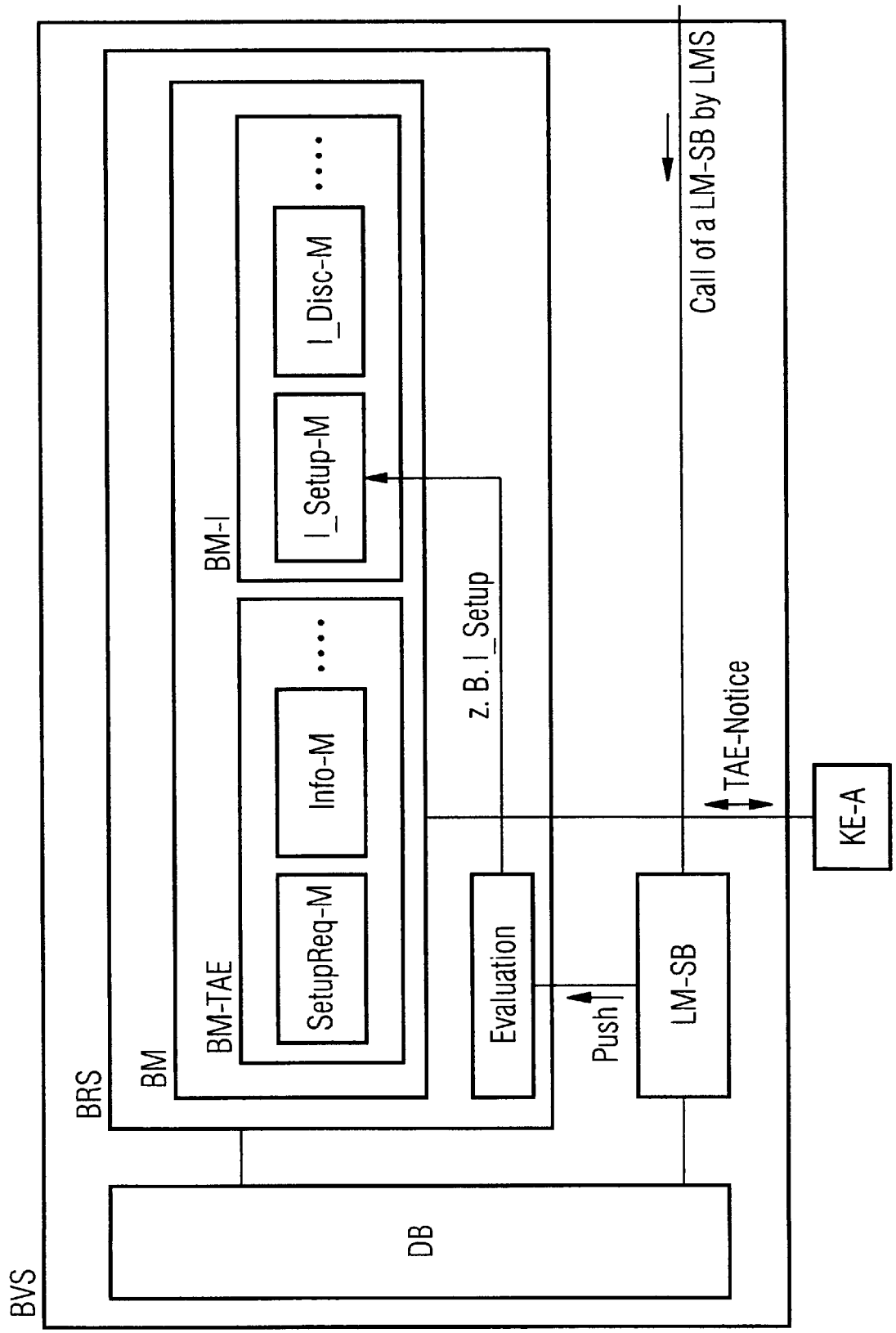
FIG. 2 is a more detailed block illustration of the structure of the base switching system as employed in FIG. 1.

As explained above, a very modularly structured base switching system that is shown in FIG. 2 is obtained with the following features:

separation of the basic call controller BRS, the performance characteristics control modules LM-SB and the database DB, as well as a message-oriented sub-division of the basic call controller BRS.

Figure 8:
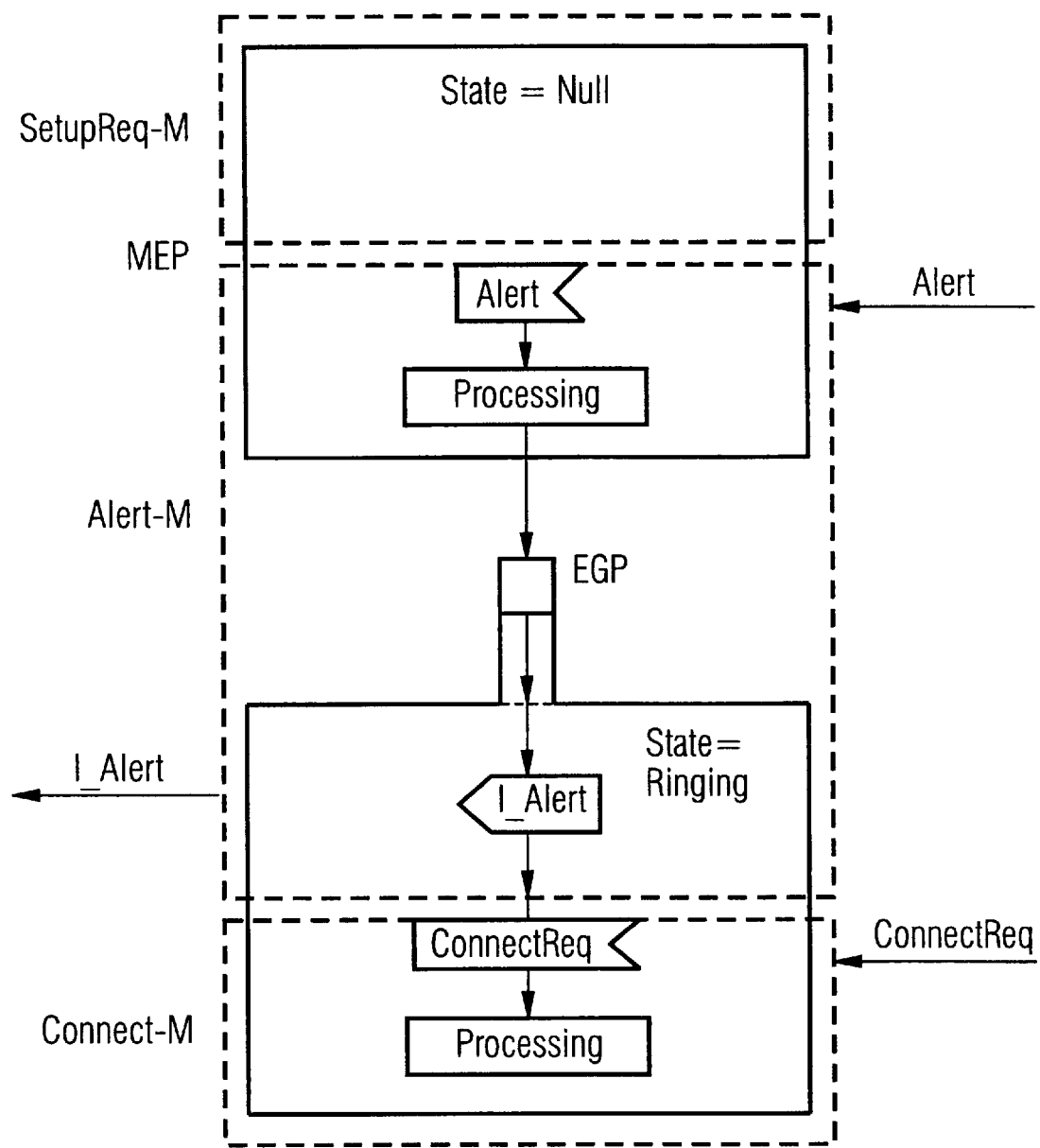
FIGS. 8 and 9 the processing modules of specific status changes of the execution of FIG. 7.

FIG. 8, which will be explained in detail later, shows the imaging of the status transitions of the connection onto the message-oriented structuring of the basic call controller with reference to the example of the status transition from zero to ringing (terminal equipment rings).

FIG. 2 shows the structure of a base switching system BVS of FIG. 1 in greater detail. The basic call controller BRS is thereby divided into processing modules BM, whereby a distinction is made between processing modules BM-TAE that are stimulated by subscriber/network messages called TAE messages here and processing modules BM-I that are stimulated by internal messages. Examples of TAE messages and the correspondingly allocated processing modules BM of the basic call controller BRS are divided into signals that are communicated from communication terminal equipment KE-A to the call controller BRS such as, for example, setup request=Setup, selection digits=Info, hanging up the receiver=Disc, terminal equipment rings=Alert, lifting up the receiver=ConnectReq and call attempt failed=SetupRej. In the opposite direction, the subscriber/network signalling supplies the subscribers or, respectively, the communication terminal equipment KE-A with information about the status of the call and about the parties in the call via the subscriber/network interface (not shown). In detail, the subscriber can receive, for example, the following information: "Dial tone"=SetupAck, "input selection information valid"=InfoComplete, ". . . invalid"=InfoInvalid, incoming call=SetupReq, "ringing tone, party rings"=Alert, "call through-connected"=ConnectReq, "busy signal, party busy" Busy, "party has hung up"=PartnerDisc, and "Connection request not possible at the time"=SetupRej. FIG. 2 shows the processing modules SetupReq-M and Info-M as processing modules that are respectively stimulated by a TAE message of the same name.

The automatic status units of the connections that participate in a two-party call communicate via messages, what are referred to as internal signals or internal messages. These serve the purpose of transporting information to the partner side, i.e. from the A-subscriber side to the B-subscriber side or vice versa, i.e. between the two connections. However, they also trigger status transitions. Information to be transmitted to the partner side are, for example: "Called side is busy"=I-Busy, "party free and rings"=I-Alert, "caller"=I-Setup, "party has answered"=I-Connect and "party has hung up"=I-Disc. Of these messages, I-Setup, I-Disc and I-Busy can effect status transitions in the automatic status units.

As examples of processing modules BM-I stimulated by internal messages of the same name, FIG. 2 indicates I-Setup-M and I-Disc-M.

Figure 6:
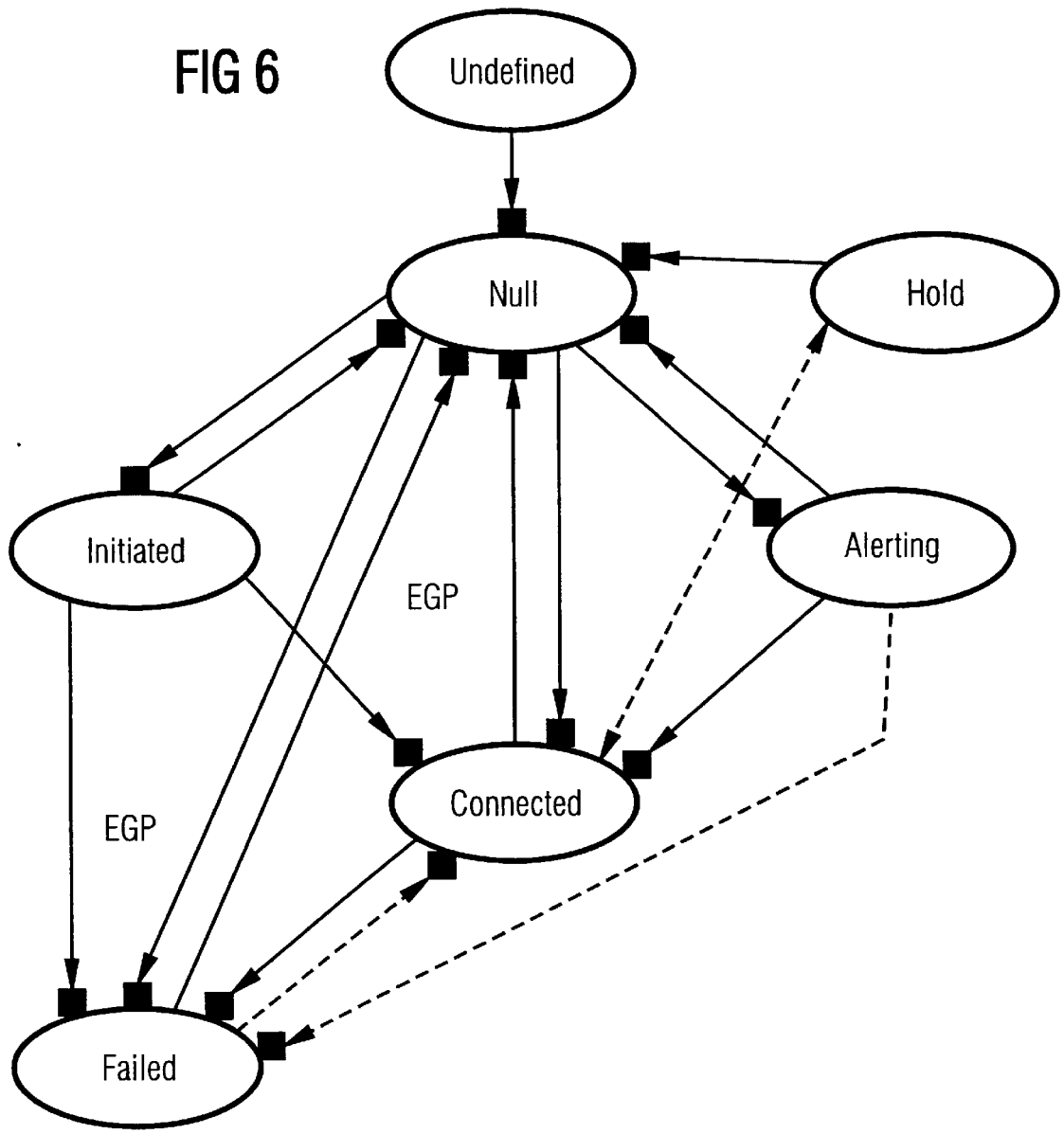
FIG. 6 is statusses that an automatic status unit of a connection as can be employed in a basic call controller according to one of the FIGS. 1 through 5 as well as the status transitions and the arrangement of event generation points.

FIG. 6 shows the statusses that an automatic status unit of a connection can assume as well as the status transitions and the places at which event generation points are or can be arranged. The automatic status unit shown in FIG. 6 has the following statusses available to it:

"Undefined": initialization, automatic status unit does not exist.

"Zero": automatic status unit created;

"Initiated": collecting the selection information after the connection request was indicated;

"Ringing" (Alerting): subscriber rings;

"Connected": caller has forwarded valid selection information, the B-side connection setup begins or, respectively, the called party has picked up the receiver;

"Hold": connection is on hold, can thus be re-assumed, i.e. placed into the Connected status;

"Rejected" (Failed): caller forwards invalid selection information called party is busy.

Specific transitions occur between this statusses, whereby some are covered during the normal course of the call control, i.e. in the execution of a two-party call, but others can only be triggered by the intervention of a performance characteristic. Both types of transition are entered in FIG. 6, whereby the transitions compelled by a performance characteristic are shown with broken lines. In the illustrated call status model (automatic status unit), one finds defined points, what are referred to as event generation points, that enable the generation of events during the course of the connection processing. These events are sent to the performance characteristics controller [sic] LMS and indicate there that a status transition has occurred in the connection processing. The event generation points EGP can be explicitly set by the performance characteristics system LMS.

When an event generation point is set, an information about the occurrence of the event suffices in certain instances. Sometimes, however, an intervention of the performance characteristic in the execution of the call processing BRS is required. In this case, the execution of the basic call controller BRS must be capable of being arrested at the trigger point ( event generation point). A specific attribute can therefore be allocated to an event generation point EGP upon activation thereof. Such an attribute can be either "notification" or "wait for reply". The event is generated in both instances. Given the attribute "wait for reply", however, the call controller is stopped until further notice.

Since an event generation point EGP can be occupied by different performance characteristics LM1, LM2, LM3 with different attributes, the stronger attribute preferably has precedence, i.e. as long as one activation with wait for reply is present, this attribute is valid for the event generation point EGP.

No event generation point that initiates an interruption of the connection processing execution of the basic call controller BRS is preferably set at places that require a status transition due to action of a subscriber. This prevents inconsistencies between the status of the communication terminal equipment and the automatic status unit of the appertaining connection.

Since the event generation is bound to the status transition, this information—in case the status transition cannot be implemented because of an event generation point with the attribute "wait for reply" can subsequently no longer proceed to the performance characteristics controller LMS. Moreover, there is no possibility of making up this status transition later. For that case wherein, for example, the action is the subscriber picking up the receiver, this means that the information of the receiver being picked up is lost for the basic call controller BRS.

The following three cases of an interrupted connection processing of the basic call controller can occur:

Given an interrupted connection processing at the A-side (caller side), a subscriber action at the A-side leads to a status transition but not to a signal generation. Consequently, no actions occur in the target status.

Given an interrupted connection processing at the B-side (side of the called subscriber), an internal message comes from the A-side. In this case, the internal message is discarded at the B-side, even if it would effect a status transition in the automatic status unit ZA-B of the B-side.

A selection information message (INFO) at the A-side is only processed in the status "Initiated" but otherwise discarded.

For example, the status transition to "Connected" should be implemented given a transition from zero to ringing when the called subscriber picks up. No interruption of the connection processing should be implemented either given a status transition from initiated to zero or from connected to zero since the status zero can no longer be left by influencing the automatic status unit, i.e. the cleardown of a connection that has already been initiated can no longer be prevented.

It is consequently not meaningful to interrupt the connection processing for these status transitions. Even given interrupted connection control, the appertaining status transition is therefore carried out by the connection processing of the basic call controller BRS given actions initiated by subscribers or, respectively, on the part of the communication terminal equipment KE-A, KE-B. Setting these event generation points can nonetheless be potentially advantageous since no internal messages can be generated or processed given an interrupted basic call controller.

The events reported from the base switching system to the performance characteristics system are, on the one hand, trigger events, i.e. event messages that are sent to the performance characteristics system when a set event generation point is reached, as well as status events that indicate the change in the status of a line unit. Possible statusses, for example, are thereby free, busy, not connected or malfunctioning.

The base switching system preferably generates a specific event for each event generation point EGP. In order to be able to unambiguously describe the event generation point EGP, the connection in which the status transition has occurred and the direction thereof must be known in addition to the type of event. Another important information for the performance characteristics system is whether the attribute of the event generation point was "notification" or "wait for reply". These data and, potentially, a few further information accompany an event message as parameters and are transmitted from the base switching system BVS to the performance characteristics system LMS in the framework of a protocol.

A status event is generated when the corresponding status change ensues and a monitor for this status change was set. According to the possible statusses, a monitor for, for example, "free to busy", "busy to free" can be set or also as a continuous monitor that monitors all status changes.

Figure 7:
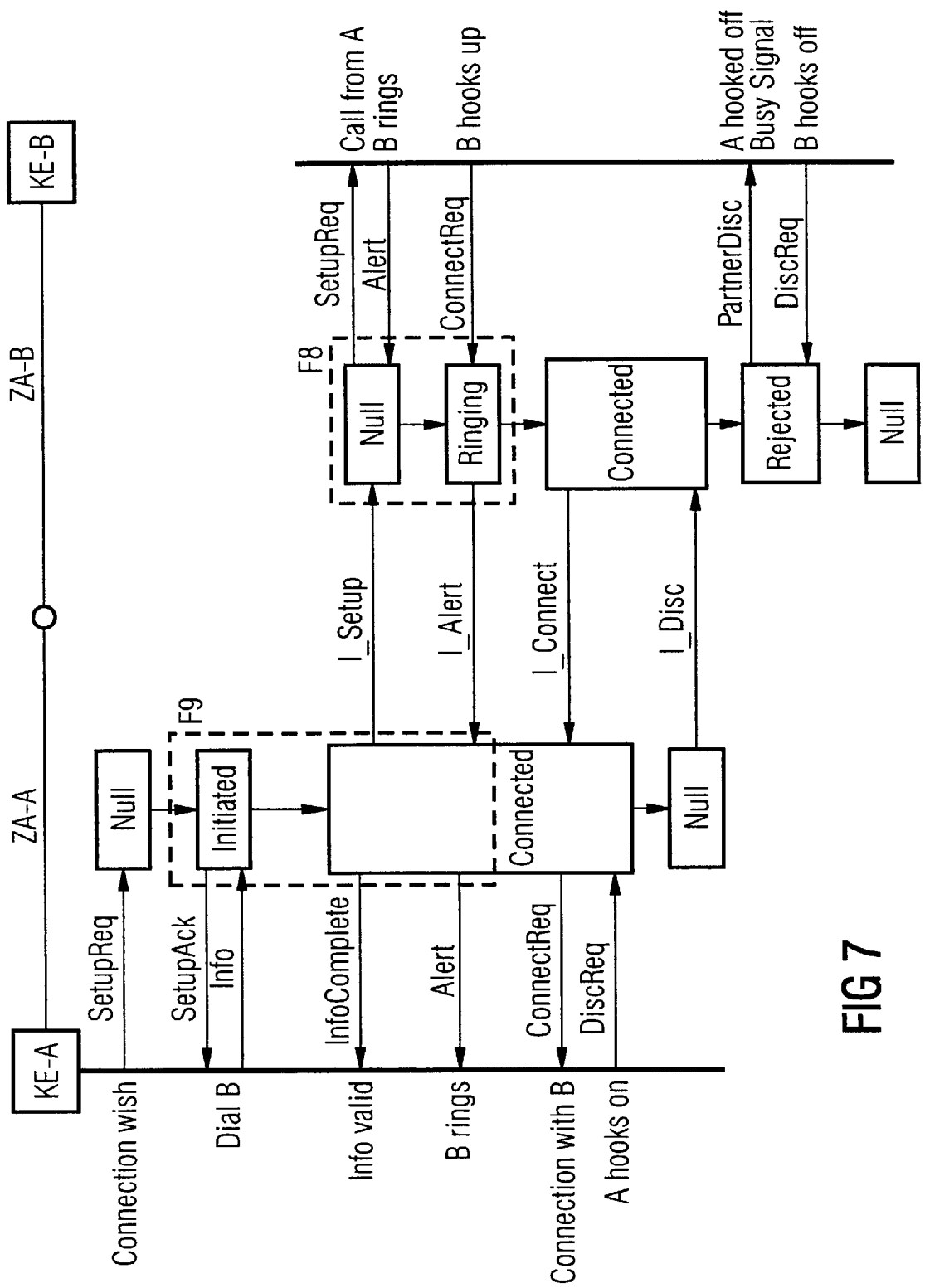
FIG. 7 is the call model of a two-party call, composed of two half-calls with a respective automatic status unit allocated to each half-call as well as the execution of the straight-forward case of a two-party call.

The functioning of automatic status units for the normal execution of the basic call controller is shown below on the basis of a two-party call with reference to FIG. 7. FIG. 7 shows the straight-forward case, i.e. the A-subscriber calls from the communication terminal equipment KE-A to the B-subscriber with the communication terminal equipment KE-B, the communication terminal equipment KE-B is free, the subscriber A initiates a call cleardown after call setup has ensued.

FIG. 7, top, shows the model of the two-party call in the form of a half-call and a connection with subscriber. The call between the communication terminal equipment KE-A and the communication terminal equipment KE-B is composed of a respective connection with appertaining automatic status unit ZA-A and ZA-B that are connected to a two-party call via the call. The communication terminal equipment communicate with the base switching system (not shown in the model) via the subscriber/network interface (likewise not shown in the model). The automatic status units ZA-A and ZA-B of the A-side and B-side communication thereby communicate via internal messages. The call objects RO of which a two-party call is composed are represented by data that are deposited in the database DB (also not shown in the model). The execution of the connection setup and cleardown shown in FIG. 7 is presented below: By picking up the receiver, the A-subscriber communicates a connection request to the basic call controller. To this end, the communication terminal equipment KE-A transmits the message SetupReq to the base switching system BVS. The connection at the side of the automatic status unit ZA-A is created. The automatic status unit ZA-A of the connection is in the status zero and changes into the status initiated. The basic call controller BRS acknowledges this in the message SetupAck requests that the subscriber input the selection information.

The subscriber A forwards the selection information Info to the basic call controller. The basic call controller checks the validity of the selection information and acknowledges a positive check with the message InfoComplete to the A-subscriber after transition of the automatic status unit of the connection into the status "connected". Further, the internal message I-Setup is generated for creating the B-side connection.

The B-side connection is created, i.e. the automatic status unit ZA-B switches into the status zero and the B-subscriber is informed of the call coming from A by the message SetupReq. The communication terminal equipment KE-B acknowledges the signalling with the message "ringing" (Alert). The automatic status unit ZA-B subsequently switches from the status zero into the ringing status. Further, the internal message I-Alert is transmitted to the automatic status unit ZA-A of the A-connection. With the message Alert, the basic call controller BRS informs the A-subscriber that the communication terminal equipment KE-B is ringing. When the B-subscriber answers, the communication terminal equipment KE-B transmits the message ConnectReq to the basic call controller. The automatic status unit ZA-B switches from the ringing status into the connected status and outputs the internal message I-Connect. The basic call controller acknowledges the connection setup to the A-subscriber with the message ConnectReq. When the A-subscriber would like to end the connection by hanging up the receiver of the communication terminal equipment KE-A, the communication terminal equipment KE-A transmits the message DiscReq to the basic call controller. The automatic status unit ZA-A of the connection switches from the connected status into the zero status and outputs the internal message I-Disc. The automatic status unit ZA-B of the connection switches from the connected status into the rejected status and signals the B-subscriber via the message PartnerDisc that the A-subscriber has hung up. After hanging up the receiver at the communication terminal equipment KE-B, the latter sends the message DiscReq to the basic call controller. In response thereto, the automatic status unit ZA-B of the connection switches from the rejected status into the zero status.

The method execution of the status transition of the automatic status unit ZA-A of the connection from initiated to connected is bounded with a broken line in FIG. 7 and referenced F9. This module or, respectively, these modules of the basic call controller are shown in greater detail in FIG. 9.

FIG. 8 shows the method step from the zero status to the ringing status of the automatic status unit ZA-B of the connection that is likewise bounded with a broken line in FIG. 7 and referenced F8 in detail. The imaging of the status transitions of the connections onto the message-oriented structuring of the basic call controller BRS can be seen with reference to this example. A basic call control module BM performs processing operations both for an initial status $Z_i$ of the connection as well as for the successor status $Z_{i+1}$. For the status $Z_i$, these operations are:

receiving the message that triggers the transition;
checking conditions for determining the successor status; and
assuming the successor status.

The processing operations for the successor status $Z_{i+1}$ are:
handling event generation point;
outputting acknowledgments that represent the status transition; and
outputting internal signalling to the partner or, respectively, to the automatic status unit of the partner connection.

When the appertaining event generation point EGP is set with the attribute "reply required", then the transmission of messages such as, for example, acknowledgments and internal signalling is suppressed in the succor status. The basic call controller is suspended at the entry of the successor status.

The status transition to zero upon cleardown of a connection represents an exception in the division of the processing operations onto $Z_i$ and $Z_{i+1}$ since not only are messages sent here in the successor status but the connection is additionally deleted in the database.

As shown in FIG. 8, the automatic status unit ZA-B of the B-side connection is in the zero status when the setup request module SetupReq has been processed. A message entry point MEP is provided here at which the subscriber/network message can be input. This message Alert for signalling that the communication terminal equipment KE-B is ringing is input at the entry point MEP of the alert module Alert-M. After processing the message Alert, the automatic status unit ZA-B of the connection reaches an event generation point EGP that can be activated by a performance characteristic. When this event generation point is activated and has the attribute "reply required", then the execution is continued in the alert module only after reception of the reply for the continuation. For example, the required reply can be a command ContBCP (basic call processing continue) initiated by the performance characteristics control module LM-SB denoting that the execution of the basic call controller should continue.

When the event generation point is not activated or when the required reply has been received, the automatic status unit ZA-B of the connection switches from the zero status into the ringing status. The internal message I-Alert is also output to the partner side. With the end of the alert module. the basic call controller then reaches another message entry point at which the communication terminal equipment KE-B expects the connect request message ConnectReq in the example of FIG. 8. The connect request message is input at the entry point of the connect module Connect-M and processed within this module Connect-M.

If the basic call controller, as briefly indicated above, is to be continued at an event generation point after interruption, it is consequently also meaningful to provide status entry points in the structure of the basic call controller at which the execution of the basic call controller can be entered as needed. This results in a further subdivision of the basic call control processing modules BM, BM-TAE, BM-I, as can be seen in FIG. 9 with reference to the example of the change in status from initiated to connected taking into account the input of the selection information Info and the processing of the selection information resulting in the message output Info-Complete and I-Setup.

The above-described processing modules BM of the basic call controller BRS are thereby divided into sub-modules in the following way:
input handling:
evaluation of the input signal (input);
decision about status change to be implemented;
assuming the successor status and message to appertaining "continue" module
handling of the event generation point and acknowledgment: a successor handling unit that has the following jobs is provided per possible status change:
event generation point handling with
event generation and
potentially suspending the basic call controller BRS for this connection;
generating messages:
acknowledgments to the subscriber/network side and internal messages to the partner side.

Figure 9:
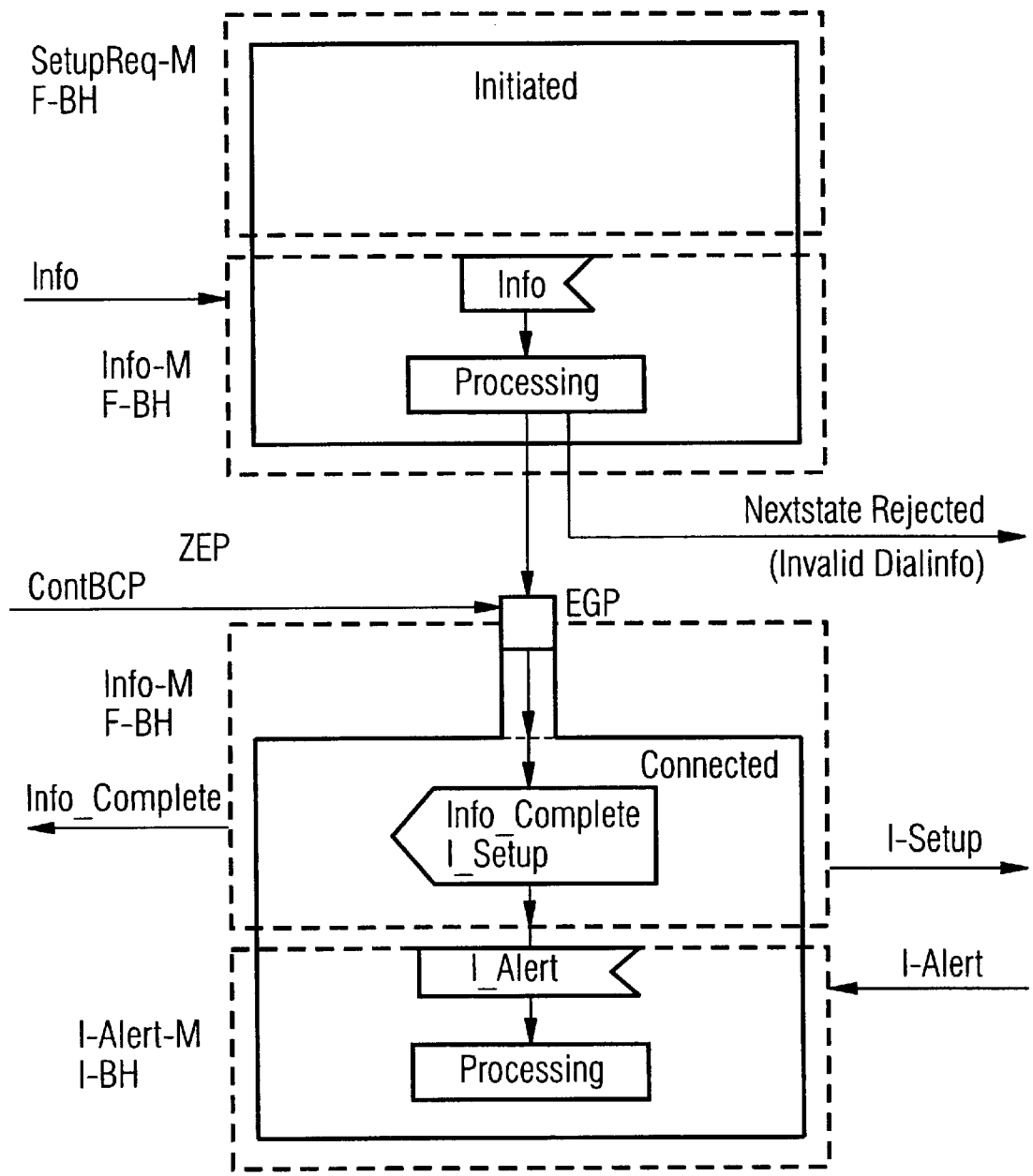

The example of such a development of the invention shown in FIG. 9 proceeds from the initiated status of the automatic status unit ZA-A of the connection in the setup request module SetupReq-M as successor handling F-BH. This leads to a message entry point at which the message Info is input. The input of the message Info is processed in the info module Info-M as input handling I-BH. The module Info-M has two possible output results. When the selection information Info was invalid, the successor status "rejected" (not shown here) follows with appertaining event generation point. When the selection information Info was valid, an event generation point EGP of the successor status "Connected" is reached. The event generation point EGP can have the attribute "reply required", i.e. a status entry point ZEP is provided at this location. A message ContBCP initiated by a performance characteristics control module LM-SB for continuing the basic call control is input at this status entry point ZEP, whereupon the required basic call controller sub-module of the processing module Info-M is processed as successor handling F-BH. The automatic status unit ZA-B of the connection thereby changes into the connected status and the messages Info-Complete and I-Setup are output. After input of the internal message I-Alert as in put handling I-BH, the module I-Alert-M is subsequently processed.

Figure 3:
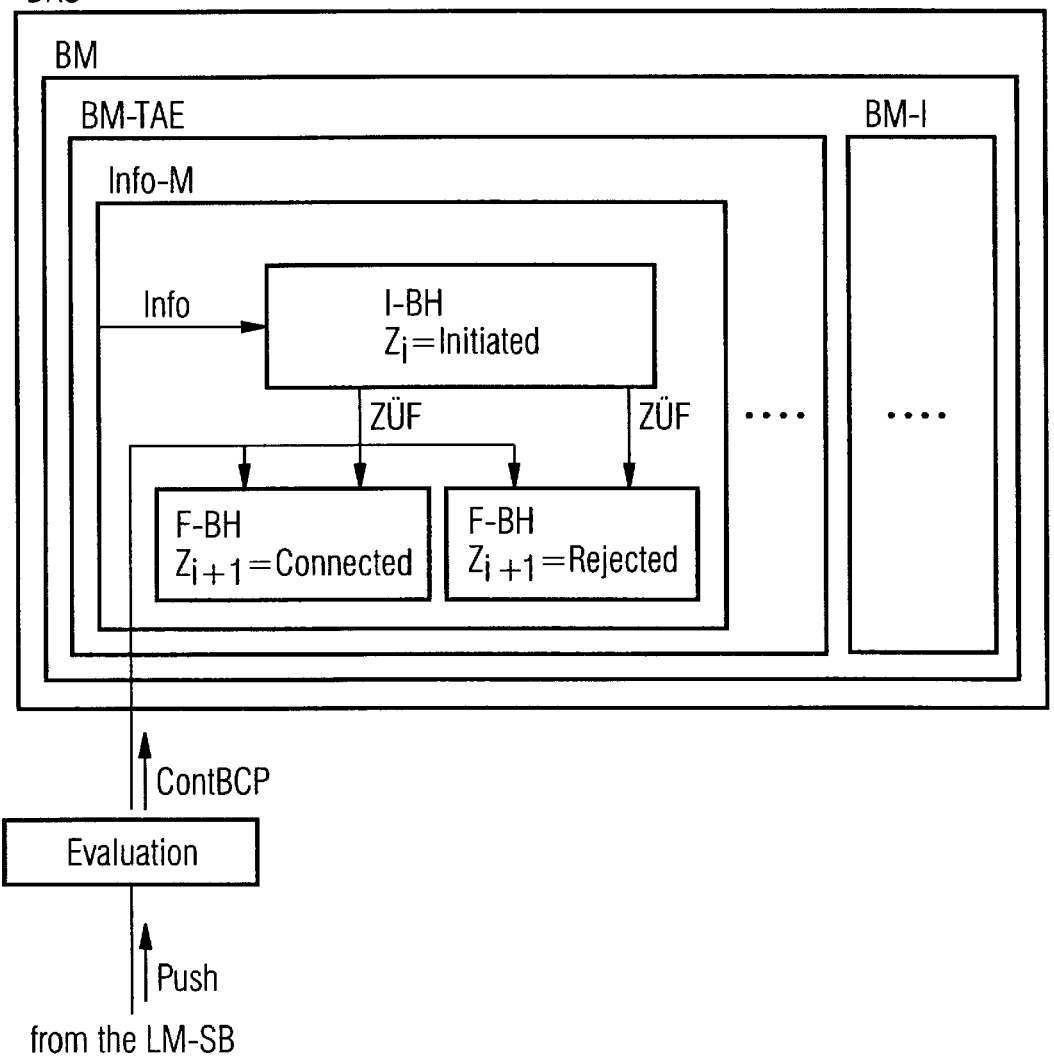
FIG. 3 is a block illustration of a basic call controller as employed in a base switching system of FIG. 2.

With reference to the example of the processing module Info-M, FIG. 3 shows the structure of the basic call controller BRS that enables both message entry as well as status entry. In the status $Z_i$=initiated, the input handling I-BH decides—after checking the input selection information Info—about the successor status to be assumed and sends the continue message Züf for continuing the handling of the status change to the successor handling module F-BH for the corresponding status $Z_{i+1}$=connected or $Z_{i+1}$=rejected. An event generation point that is not shown in FIG. 3 is located at the input of the successor handling F-BH. When this is activated and has the attribute "reply required", then the basic call control is suspended at the point, the successor handling F-BH is not immediately executed. When a continue command is triggered by a performance characteristics control module LM-SB, then, due to this trigger, an evaluation means Evaluation outputs a continue message Cont-BCP to the pertinent successor handling sub-module F-BH. The message ContBSP acts on the successor handling module F-BH of the selected status $Z_{i+1}$ in the same way as the command Züf output by the input handling sub-module but without the occurrence of an event generation at the event generation point. The event generation point, however, is the point of entry for the message ContBCP.

Figure 4:
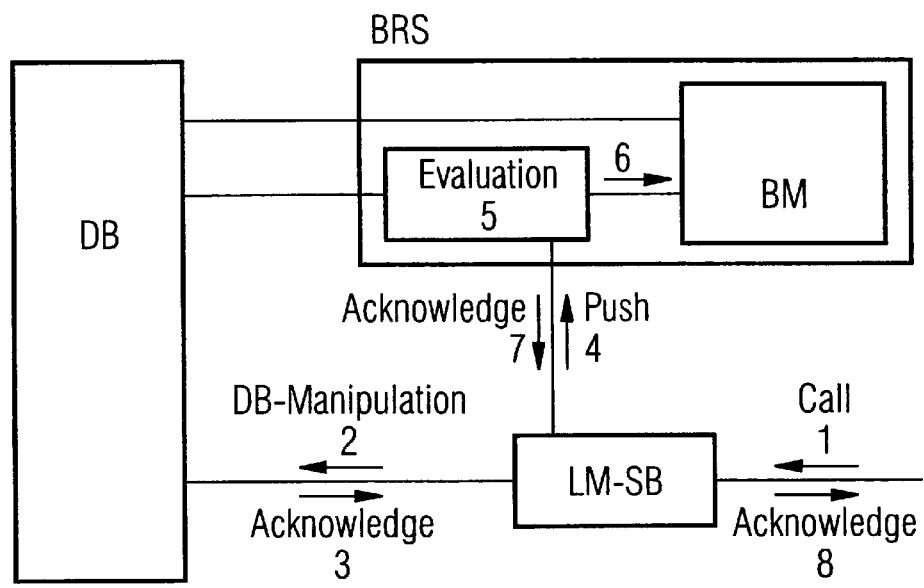
FIG. 4 is a block illustration of an execution implemented with the assistance of performance characteristics control modules according to one of the FIGS. 1 through 3.

With the assistance of performance characteristics control modules LM-SB, the performance characteristics system LMS manipulates: the setup and cleardown of connections by the basic call controller BRS. To this end, the performance characteristics control modules LM-SB access the database DB of the basic call controller BRS. FIG. 4 shows the general execution of the performance characteristics control module processing, particularly the manipulation of call objects, by the base switching system BVS. The numerals recited in the FIG thereby indicate the time sequence of the individual events. FIG. 4 shows the database DB, the performance characteristics control modules LM-SB and the basic call controller BRS with an evaluation means Evaluation and processing modules BM as well as information flow paths between these components.

The execution shown in FIG. 4 is listed below with the assistance of the numbers indicated in the FIG:

1 Call of the performance characteristics control modules by the performance characteristic LM, particularly the performance characteristics system LMS;

2 Manipulation or, respectively, creation of the corresponding call object in the database DB by the performance characteristics control modules LM-SB;

3 Acknowledgment of the database access to the performance characteristics control modules LM-SB;

4 Initiation of the basic call controller by the performance characteristics control modules with the significance "process manipulated connection" upon indication of the required information such as, for example, terminal equipment identification, connection identification and control information;

5 Evaluation of the initiate signal on the basis of the data of the new or, respectively, manipulated call object by the evaluation means Evaluation;

6 Potential output of internal messages such as, for example, I-Setup from the evaluation means to the processing modules BM;

7 Acknowledgment of the initiation of the basic call controller from the basic call controller to the performance characteristics control modules LM-SB;

8 Acknowledgment from the performance characteristics control modules LM-SB to the performance characteristic LM, particularly the performance characteristics system LMS.

Upon initiation of the basic call controller by the performance characteristics control modules LM-SB, the identification of the communication terminal equipment KE and of the connection as well as a control information that defines the desired handling in the basic call controller are co-supplied as parameters. The control information can assume the values delete, setup, status change and continue. This parameter is necessary since what processing is to be executed in the basic call controller cannot always be unambiguously determined from the stored data of a connection. When deleting a connection, the steps 2 and 3 shown in FIG. 4 can be eliminated since the attribute "delete" already has enough confidence.

Steps 2 and 3 are likewise omitted when the performance characteristics control module LM-SB calls for continuation of the basic call control, i.e. when the message ContBCP is delivered. The initiation handling must merely define the continuation point (status entry point) in the automatic status unit of the connection in order to be able to send the corresponding message to the basic call control sub-module.

When a performance characteristics control module LM-SB that creates a connection or a half-call, i.e. a communication terminal equipment, a connection as well as a call without partner is called, a determination can be made as to whether the basic call controller should be automatically initiated or not after the creation in the database. If an event generation point EGP is to be set for a connection that was just generated, then the basic call controller BRS dare only set this connection up when the event generation point is already active. The identifier of the connection, however, after the acknowledge message of the performance characteristics control module in the performance characteristic. For this reason, the basic call controller BRS is only initiated in such a case after the event generation point has been set by the call of the performance characteristics control module or, respectively, the message BCPCont.

With reference to the example of the performance characteristics control module "Create Half Call", the handling of the performance characteristics control module is explained in detail below in FIG. 5.

Create Half Call generates an incoming or outgoing half call. When the conditions for a successful creation of the half call are met, namely subscriber free and resources available, then a new connection whose partner entry is "performance characteristic" is created in the database. A valid partner communication terminal equipment does not exist at this point in time. An outgoing connection is thereby created in the connected status, an incoming call in the zero status.

If the call controller is to be automatically initiated on the basis of the control information contained in Create Half Call, then the corresponding performance characteristics control module LM-SB sends an initiate signal CPSync to the basic call controller BRS, said signal containing the parameter "setup" in addition to the parameters for the communication terminal equipment identification and for the connection identification. If an initiation of the basic call controller BRS is not possible, then the evaluation means Evaluation sends a signal CPSynRej to the performance characteristics control module, which outputs a signal Create Half Call Rej in response thereto. This is the case when, for example due to cleardown of the connection by the subscriber, the connection data in the database DB are already deleted. Finally, the identifiers of the generated half call and those of the appertaining. connection are handed over to the performance characteristic LM or, respectively, the performance characteristics controller LMS.

Figure 5:
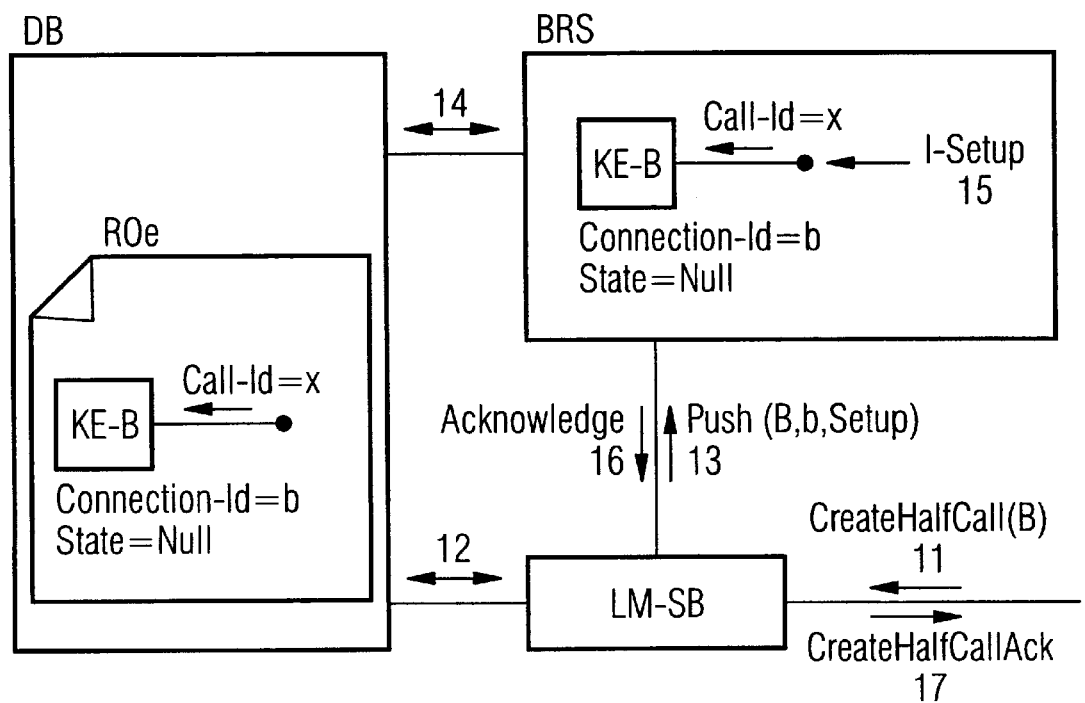
FIG. 5 is a specific exemplary embodiment of an execution according to FIG. 4.

The execution shown in FIG. 5 is listed below with the assistance of numbers 11 through 17 indicated in the FIG:

11 The performance characteristics controller LMS calls a performance characteristics control module LM-SB with a message Create Half Call having the parameters B for the communication terminal equipment, Incoming for the connection, Zero for the status and AutoCPSync as control information that states that the call controller should be automatically initiated.

12 Creating the new call objects ROe in the database DB
Call: Callid
Connection: Connectionid, status=zero, direction= incoming
Acknowledgment of the database access:
Returning the connection data and the identification identifiers;

13 Initiation of the basic call controller by the performance characteristics control module LM-SB: "Process Connection: KE.id, Conn.id, Setup":

14 Readout of the connection data from the database DB by the basic call controller BRS;

15 Generating an internal message I-Setup-M for the dynamic processing of the connection with the virtual partner "performance characteristic". The subscriber/ network signalling is processed. The internal signalling to the partner is thereby automatically discarded;

16 Acknowledgment of the initiation by the basic call controller BRS to the performance characteristics control module LM-SB;

17 Acknowledgment of the performance characteristics control module call to the performance characteristics controller LMS with return of the identifiers.

The basic call controller BRS is automatically initiated in the example shown in FIG. 5. When a prior setting of event generation points EGP is necessary, this can only occur after creation of the half call in the database DB, since the required identifier of the connection is not previously known. The setup of the half call is then explicitly initiated via the performance characteristics control module BCP-Cont. The basic call controller is not interrupted for the newly created connection. However, it only exists in the database DB and, since it only belongs to a half call, it cannot receive any internal signalling. The subscriber or, respectively, the subscriber's communication terminal equipment to be linked in later can also not generate any signalling for this connection since the setup has not yet begun.

Performance characteristics control modules LM-SB can initiate the basic call controller BRS for specific connections with the assistance of initiate signals. The identifier of the communication terminal equipment KE-A, the connection identifier and a control information such as, for example, setup, delete, status change or continue are co-supplied as parameters in such initiate signals.

As a result of this mechanism, it is possible for the performance characteristics control modules LM-SB to execute certain actions such as, for example, the setup or cleardown of a call and the required signallings with the assistance of the basic call controller BRS. The separation into functional units is thereby also realized in the inside of the base switching.

A performance characteristics control module LM-SB respectively hands the jobs that are normally processed by the basic call controller BRS over to the basic call controller BRS. The performance characteristics control module LM-SB thereby generally deposits data in the database DB such as, for example, the creation of a new connection, the entry of a new status, etc. The basic call controller BRS is then initiated and completes the processing.

The initiation handling first requests the connection data from the database DB for the connection handed over in the parameters. If the connected was identified as arrested, this attribute is now deleted. What actions are to be carried out are then identified on the basis of the connection data and the control information.

The signals I-Setup or, respectively, I-Disc are generated for the setup or, respectively, cleardown of a connection. The normal further-processing in the basic call controller BRS is initiated by these signals.

Given status changes, internal message that signal the status change to the subscriber can be generated. Examples of these are I-Busy and I-Connect.

Upon continuation of the execution of the basic call controller BRS, the reentry point is determined in the automatic status unit ZA-A of the connection, and the message to continue the status processing is sent to the appertaining sub-module of the processing module BM of the basic call controller BRS.

The initiation handling acknowledges the successful execution of its actions to the performance characteristics control module LM-SB with a message that has an identifier Ack for acknowledge appended at the end. A message with the ending Rej for reject indicates that the action could not be successfully carried out. Such a reject signal is generated, for example, when the connection to be initiated no longer exists.

The invention is not limited to the particular details of the apparatus depicted and other modifications and applications are contemplated. Certain other changes may be made in the above described apparatus without departing form the true spirit and scope of the invention herein involved. It is intended, therefore, that the subject matter in the above depiction shall be interpreted as illustrative and not in a limiting sense.

What is claimed is:

1. A communication switching system, comprising:
a performance characteristics system and a base switching system;
the base switching system having a basic call controller for controlling a 2-party call composed of two connections communicating via messages with respectively allocated automatic status units, a database containing call objects, and a plurality of performance characteristics control modules available in an exchange in a form of callable functions for optional influencing of the call objects;
the database being accessible by both the basic call controller as well as the performance characteristics control modules; and a specific processing module allocated to each message type in an executive sequence of the basic call controller in order to enable an initiation of handling of influenced call objects upon employment of processing blocks of the executive sequence of the basic call controller by the performance characteristics system.

2. A communication switching system according to claim 1, wherein the processing modules of the executive sequence of the basic call controller are structured such that, following interruption of the processing module execution, an initiation of continued execution by the performance characteristics system is possible at an event generation point.

3. The communication system according to claim 1, wherein status transitions of individual automatic status units are triggerable by subscriber-side events and by messages within the base switching system and wherein the performance characteristics system initiates the handling of the influenced call objects by initiating an internal message to one of a plurality of automatic status units.

4. A communication switching system according to claim 1, wherein the performance characteristics system can access the database as well as initiate handling of the influenced call objects using performance characteristics control modules.

5. The communication system according to claim 1, wherein status transitions of an automatic status unit of a respectively other connection is triggerable by subscriber-side events and by messages within the base switching system, and wherein the performance characteristics system initiates handling of the influenced call objects by initiating an internal message to the automatic status unit.

* * * * *